No. 732,731. PATENTED JULY 7, 1903.
C. H. GERLING.
SEED OR POTATO PLANTER.
APPLICATION FILED MAR. 2, 1903.

NO MODEL. 4 SHEETS—SHEET 1.

Witnesses
Inventor
Charles H. Gerling
by Higdon & Longan & Hopkins

No. 732,731. PATENTED JULY 7, 1903.
C. H. GERLING.
SEED OR POTATO PLANTER.
APPLICATION FILED MAR. 2, 1903.
NO MODEL. 4 SHEETS—SHEET 2.

Witnesses
Inventor
Charles H. Gerling
by Higdon & Longan & Hopkins Attys

No. 732,731. PATENTED JULY 7, 1903.
C. H. GERLING.
SEED OR POTATO PLANTER.
APPLICATION FILED MAR. 2, 1903.
NO MODEL. 4 SHEETS—SHEET 3.
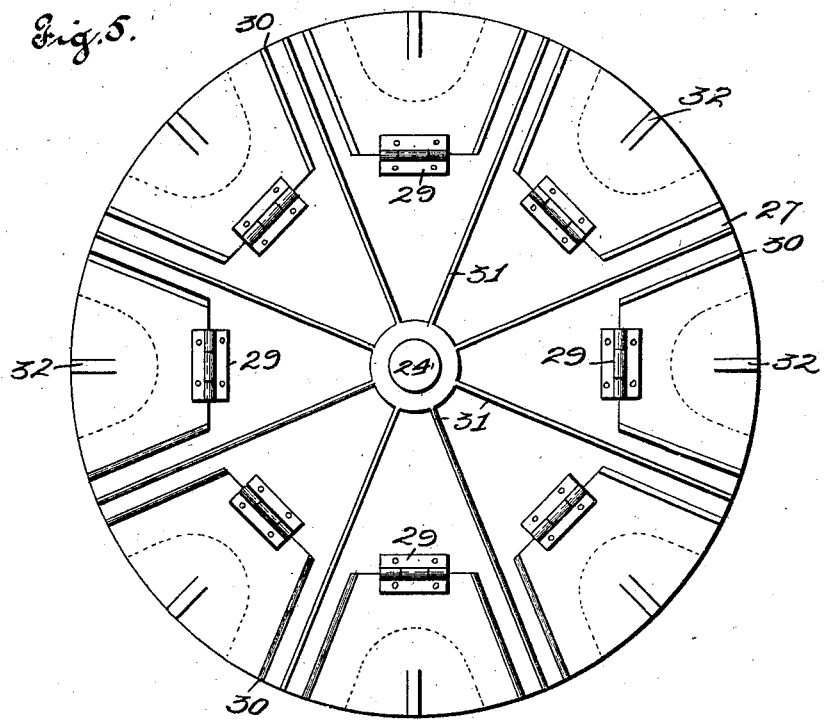
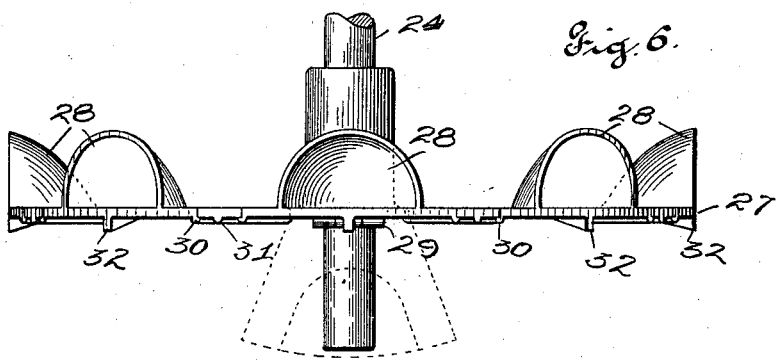

No. 732,731. PATENTED JULY 7, 1903.
C. H. GERLING.
SEED OR POTATO PLANTER.
APPLICATION FILED MAR. 2, 1903.
NO MODEL. 4 SHEETS—SHEET 4.
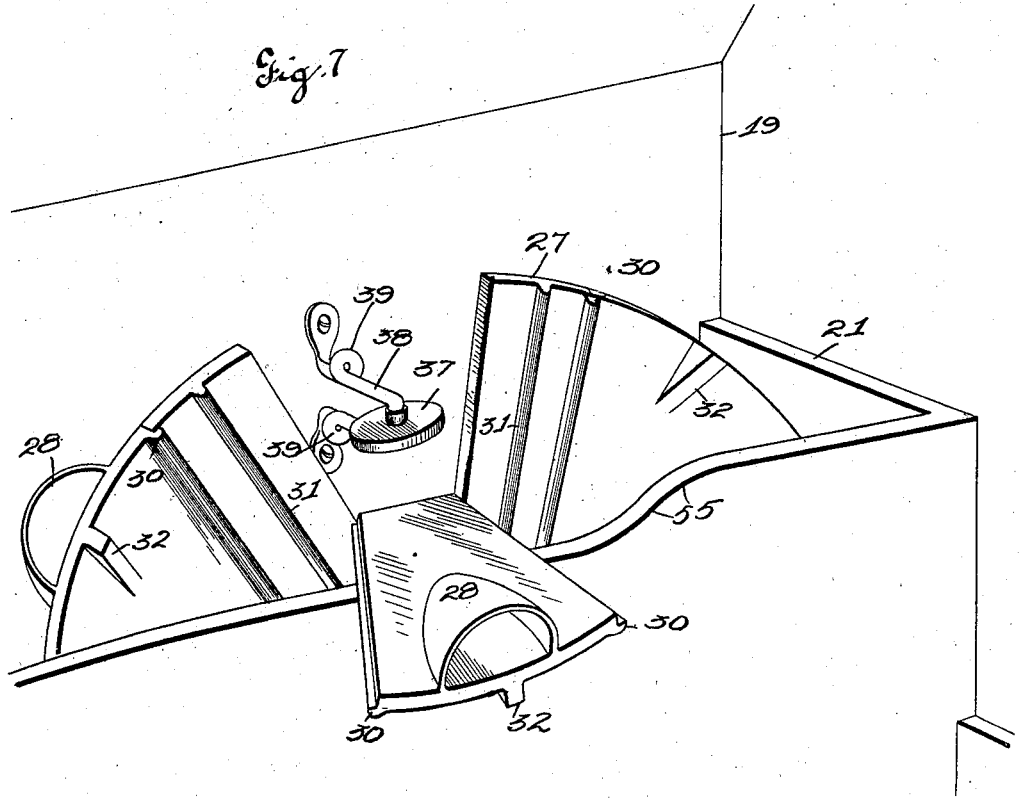
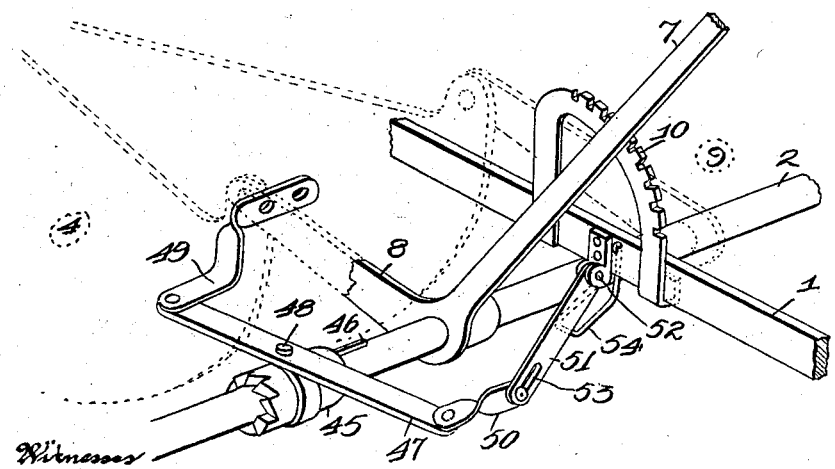

No. 732,731.

Patented July 7, 1903.

UNITED STATES PATENT OFFICE.

CHARLES H. GERLING, OF EDWARDSVILLE, ILLINOIS, ASSIGNOR TO GERLING MANUFACTURING COMPANY, OF EDWARDSVILLE, ILLINOIS, A CORPORATION OF ILLINOIS.

SEED OR POTATO PLANTER.

SPECIFICATION forming part of Letters Patent No. 732,731, dated July 7, 1903.

Application filed March 2, 1903. Serial No. 145,858. (No model.)

*To all whom it may concern:*

Be it known that I, CHARLES H. GERLING, a citizen of the United States, residing at Edwardsville, county of Madison, State of Illinois, have invented certain new and useful Improvements in Seed or Potato Planters, of which the following is a specification containing a full, clear, and exact description, reference being had to the accompanying drawings, forming a part hereof.

My invention relates to an improved seed and potato planter; and it consists in the novel construction, combination, and arrangement of parts hereinafter described and claimed.

The object of my invention is to provide a seed and potato planter with runners for opening the furrows, disks for closing the same, an improved mechanism for handling the seed more rapidly and accurately than heretofore, means for imparting continuous rotary movement to the said seed mechanism, and a hand-lever for simultaneously controlling the movement of the said seed mechanism and raising and lowering the said runners and disks.

Figure 1:
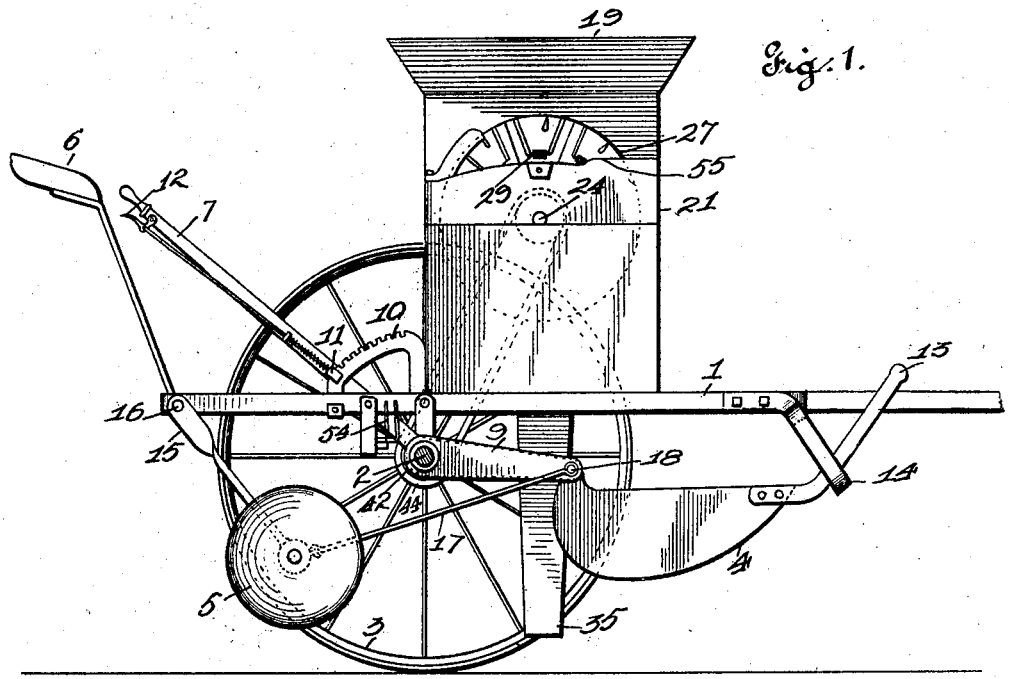
Figure 2:
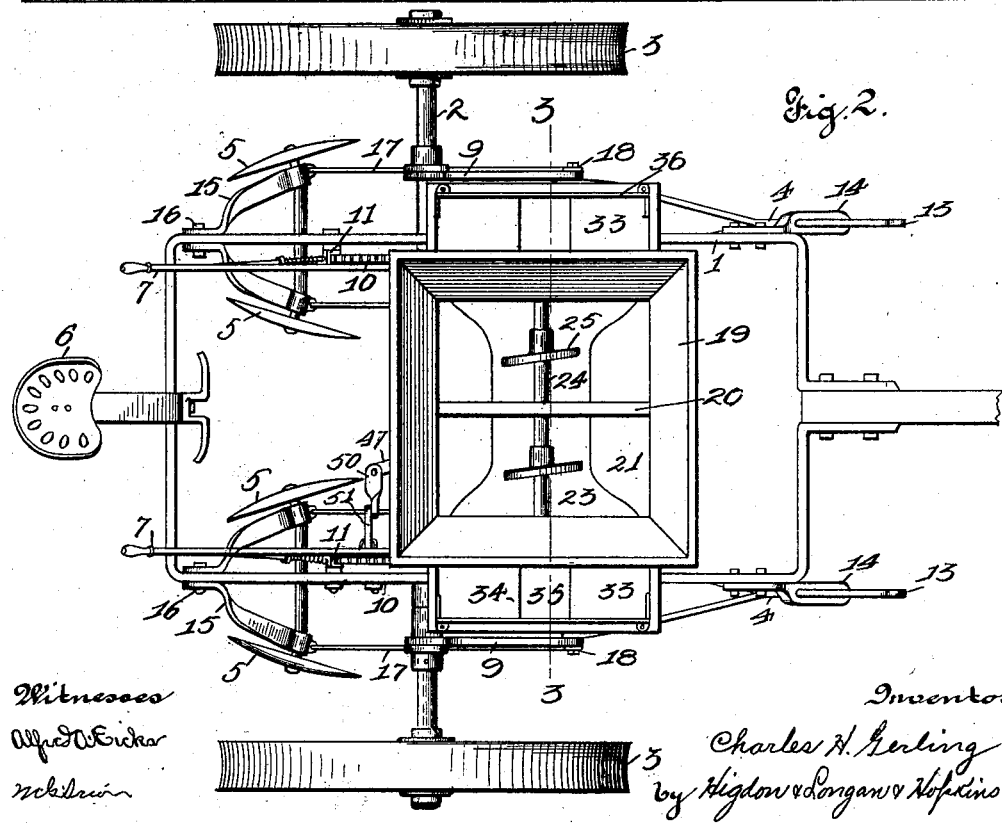
Figure 3:
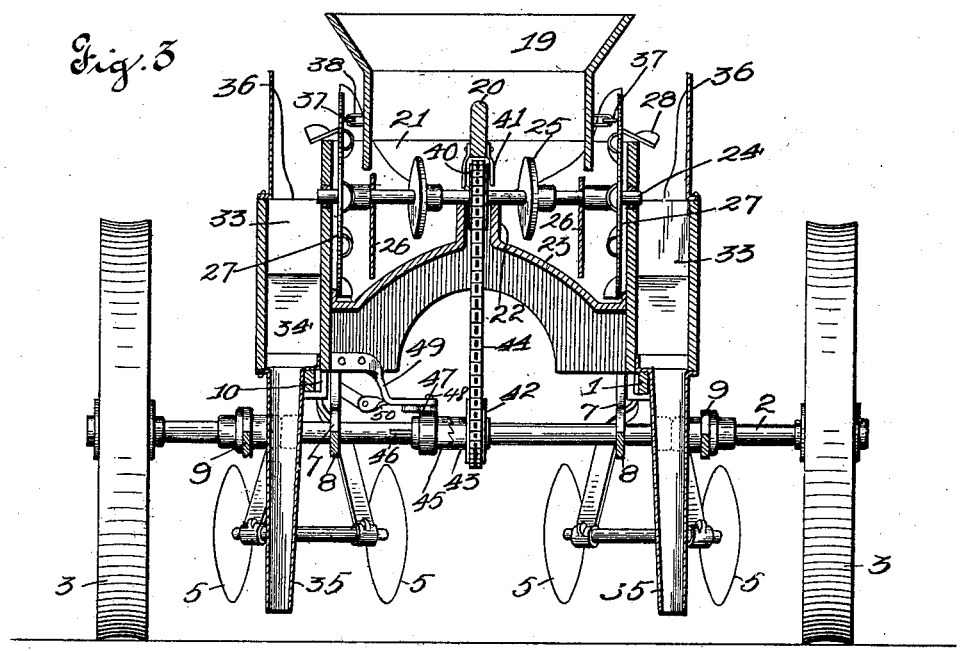
Figure 4:
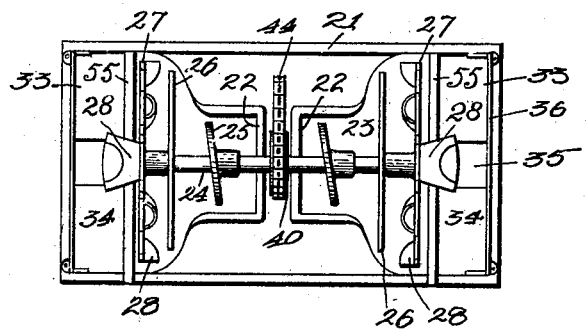

Figure 1 is a sectional side elevation of my improved seed and potato planter with the axle sectioned and the near drive-wheel removed. Fig. 2 is a plan view. Fig. 3 is a sectional front elevation on the line 3 3 of Fig. 2. Fig. 4 is a plan view of the seedbox having the hopper removed. Fig. 5 is a detail side view of one of the vertical seed-wheels. Fig. 6 is a plan view of same. Fig. 7 is a detailed perspective view of a portion of the seedbox and one seed-wheel. Fig. 8 is a perspective view of the clutch-operating mechanism.

1 indicates the frame, which is mounted upon the revoluble axle 2, carried by the drive-wheels 3. I provide furrow-opening runners 4 and seed-covering disks 5. The driver's seat 6 is mounted upon the rear of the frame 1, and pivotally mounted upon said axle, at the right hand of said seat, is a hand-lever 7 for the purpose of raising and lowering the runners 6 and disks 5, which are located upon the right-hand side of the machine. The runners and disks upon the left-hand side of the machine may be connected in the usual manner, so that a single lever will raise and lower the runners and disks upon both sides of the machine. In the present case I have shown a hand-lever for each side of the machine. The hand-levers 7 are provided at their lower ends with an arm 8, which extends at an angle to the body of the levers, and said arm is pivotally connected to the rear end of the adjacent runner 4. Said arm 8 is connected to one of the forks of its runner, and the companion fork has a link 9 pivotally connected to its rear end and to the axle, as more clearly shown in Figs. 2 and 8. The same construction is carried out upon the left-hand side of the machine. Said hand-levers 7 are preferably provided with the usual notched sector 10, the spring-actuated dog 11, and handle 12, by means of which said levers may be secured in any desired position to elevate the runners more or less.

The forward ends of the runners 4 are provided with an arm 13, which extends at an angle and is adapted to loosely slide within a suitable guiding loop or bar 14, projecting from the forward part of the frame in alinement with said arm. The opening in said bar is sufficiently large to permit said arm to assume various angles therein.

The disks 5 are mounted in pairs at an angle in the usual manner and are swung from the rear end of the frame by means of a fork 15, the upper end of which is pivotally attached to the rear portion of the frame by means of a bolt or rivet 16. 17 indicates draft-rods for the said disks, and the front end of these rods is pivotally connected at 18 to the rear of the runner 4 immediately in front. As shown, I make use of a separate draft-rod for each disk.

The seed-hopper 19 is divided centrally by a partition 20 and is removably mounted above the seedbox 21. Said seedbox is also divided centrally of its length by means of vertical partitions 22, so that its bottom 23 inclines downwardly and outwardly from said partitions. Mounted in the seedbox is a shaft 24, which has fixed upon it above each inclined portion of the bottom 23 a stirring-disk 25. Said disk is mounted at an angle, so that it will wabble when said shaft is revolved. As shown, there is a stirring-disk for each section of the seedbox. Hung loosely upon the said shaft 24, adjacent the stirring-disk in each section of the seedbox, is a plate 26, arranged to act as a cut-off to cut off the feed when the seed-plates are overfed. Fixed upon said shaft 24 in each section of the seedbox is a vertical seed-wheel 27, having in its periphery a series of hinged pockets 28. Each of said pockets has a hinge 29 at its base and by means of which the same is secured to the seed-wheel. (See Figs. 5 and 6.) Said pockets are adapted to move laterally from their normal position in one direction only and are fixed against movement in the opposite direction by means of flanges 30 upon their edges, which contact with the body of the wheel. The seed-wheel 27 is preferably made of cast metal and is provided with radial strengthening-ribs 31. The pockets project from one side of the seed-wheel, and an inclined projection 32 is formed upon the opposite side of each pocket. The pockets 28 are adapted to discharge their contents into an adjacent receptacle 33, having a hopper-shaped bottom 34, which terminates in the usual seed-spout 35. 36 indicates a vertical guard arranged upon the said receptacle 33 opposite the point where the pockets discharge to prevent the seed from being thrown over the top of said receptacle.

The pockets 28 are tilted laterally and discharged by a roller 37, yieldingly mounted upon a spring-bracket 38 and projecting into the normal path of said pockets. Said bracket 38 is secured to the side of the hopper 19, preferably at a point directly above the shaft 24. It will be observed that said bracket 38 is composed of wire, with one or more coils or twists 39 formed in the same to impart increased resiliency. Motion is imparted to the said shaft 24 by means of a sprocket-wheel 40, fixed thereon centrally of the length thereof immediately beneath the hopper-partition 20, and suitable guards 41 extend downwardly from said partition on either side of said sprocket-wheel to prevent the seed from reaching said wheel. (See Fig. 3.)

Loosely mounted on the axle 2, centrally of the length thereof, is a sprocket-wheel 42, having a clutch-hub 43, and connecting the said sprocket-wheels 40 and 42 is a chain 44. 45 indicates a clutch member splined upon the said axle 2 by means of the key 46. Said clutch member is provided with teeth to engage the hub 43 of the sprocket-wheel 42. The clutch member 45 is operated by means of a lever 47, pivoted at 48 to the said member 45 and having its forward end fulcrumed to a bracket 49, secured in a suitable manner to some part of the frame. Movement is imparted to the said lever 47 by means of a link 50, pivotally secured to the rear end of said lever in connection with an inclined bar 51, the upper end of which is pivoted to the frame at 52 and the lower end of which is slotted at 53 and pivotally connected to the said link 50. The clutch member 45 is normally held in engagement with the hub 43 by means of a spring 54, fixed at its upper end to the frame 1, so that its lower end bears against the under edge of the said inclined bar 51. Said inclined bar is located directly beneath the hand-lever 7 at the right hand of the driver's seat.

55 indicates an inclined surface located on the upper edge of the inner wall of the seed-receptacles 33 for the purpose hereinafter mentioned.

The operation is as follows: The machine is to be moved forward in the usual manner by animals or other power, and as the axle 2 revolves motion will be imparted to the sprocket-chain 44 and through it to the shaft 24. The driver should then grasp the hand-levers 7 and lower the runners 4 and the disks 5 so that said runners will open the furrows, and said disks will close the same after the seed has been dropped therein. The normal position of the right-hand hand-lever 7 during operation is that in which it is shown in Fig. 8. The seed within the hopper 19 and the seedbox 21 will gravitate downwardly therein on account of the inclined bottom 23 and will urge the cut-off plates 26 toward their respective seed-wheels, which will provide a sufficient space beneath the lower edge of said plates for the passage of the seed-potatoes to the pockets 28 of the said seed-wheels. The said seed-wheels will of course be rotated in the same direction that the drive-wheels 3 rotate, and the seed will enter the said pockets 28 while the same are moving within the seedbox, and the seed will thereby be carried upwardly within said pockets until the pockets reach the limit of their upward movement, when said pockets consecutively come in contact with the yielding roller 37 and will thereby be tilted laterally and downwardly to the position indicated in Fig. 7, and as the movement of the seed-wheels continues the pockets which have been thus tilted are consecutively brought into contact with the incline 55 and are thereby restored to their normal position and retained therein by means of their flanges 30 and inclined projections 32. Should a surplus of seed reach the seed-wheels, the same will be forced against the cut-off plates 26 by the action of the seed-wheels, and the lower edges of said cut-off plates will be urged toward the inclined bottom 23 of the seedbox, thereby closing the space between said bottom and said plates and cutting off the supply of potatoes to the seed-wheels until the surplus has been disposed off, when the said cut-off plates will again open the passage beneath them and permit other seed to pass to the seed-wheels. The stirring-disks 25 in the seedboxes will wabble continuously, and thereby effectually stir the potatoes and prevent clogging and yet not injure the potatoes in any way.

When the operator desires to cease using the machine, he grasps the hand-levers 7 and draws them toward himself until they assume the position in which they are shown in Figs. 1 and 2 and which will thereby elevate above the ground the runners 4 and disks 5. Such movement of the right-hand hand-lever will also cause the rear edge of the same to come in contact with the upper edge of the incline 51 and force the lower end of said bar outwardly against the power of its spring 54. This will have the effect of withdrawing the clutch member 45 from the clutch-hub 43 and will release said hub, and consequently stop the movement of the seed mechanism.

I claim—

1. An improved seed and potato planter, comprising a suitable seedbox, a vertical seed-wheel having at its periphery laterally-hinged pockets and mounted adjacent to said seed-box, and means for continuously rotating said seed-wheel to take the seed from said box, elevate the same and throw it laterally into a seed-receptacle, substantially as specified.

2. An improved seed and potato planter, comprising a suitable seedbox, a vertical seed-wheel having pockets and mounted adjacent to said seedbox, said seedbox having an inclined bottom, and a plate arranged to automatically hold back the supply of seed from said seed-wheel when the latter is overloaded, and means for continuously rotating said seed-wheel to take the seed from said box, elevate the same and throw it laterally into a seed-receptacle, substantially as specified.

3. An improved seed and potato planter, comprising a suitable seedbox, a vertical seed-wheel having at its periphery laterally-hinged pockets and mounted adjacent to said seed-box, said pockets being hinged to the said seed-wheel, and means for continuously rotating said seed-wheel to take the seed from said box, elevate the same and throw it laterally into a seed-receptacle, substantially as specified.

4. An improved seed and potato planter, comprising a suitable seedbox, a vertical seed-wheel having pockets and mounted adjacent to said seedbox, said pockets being hinged to said wheel and adapted to tilt laterally, a shaft on which said wheel is fixed, a sprocket-wheel on said shaft, the drive-wheels, the drive-wheel axle, a sprocket-wheel on said axle, a chain connecting said two sprocket-wheels, a clutch for disconnecting one of said sprocket-wheels, and means for continuously rotating said seed-wheel to take the seed from said box, elevate the same and throw it laterally into a seed-receptacle, substantially as specified.

5. An improved seed and potato planter, comprising a suitable seedbox, a vertical seed-wheel having pockets and mounted adjacent to said seedbox, said pockets being hinged to said wheel and adapted to tilt laterally, a shaft on which said wheel is fixed, a sprocket-wheel on said shaft, the drive-wheels, the drive-wheel axle, a sprocket-wheel on said axle, a chain connecting said two sprocket-wheels, a clutch for disconnecting one of said sprocket-wheels, a stirring-disk fixed on said shaft to wabble and stir the seed, a plate arranged between said stirring-disk and said seed-wheel to hold back the supply of seed, and means for continuously rotating said seed-wheel to take the seed from said box, elevate the same and throw it laterally into a seed-receptacle, substantially as specified.

6. An improved seed and potato planter, comprising a suitable seedbox, a vertical seed-wheel having pockets and mounted adjacent to said seedbox, said pockets being hinged to said wheel and adapted to tilt laterally, a shaft on which said wheel is fixed, a sprocket-wheel on said shaft, the drive-wheels, the drive-wheel axle, a sprocket-wheel on said axle, a chain connecting said two sprocket-wheels, a clutch for disconnecting one of said sprocket-wheels, a stirring-disk fixed on said shaft to wabble and stir the seed, a plate arranged between said stirring-disk and said seed-wheel to hold back the supply of seed, furrow opening and closing devices, a suitable hand-lever arranged to simultaneously operate said clutch and raise or lower the said furrow opening and closing devices, and means for continuously rotating said seed-wheel to take the seed from said box, elevate the same and throw it laterally into a seed-receptacle, substantially as specified.

In testimony whereof I have signed my name to this specification in presence of two subscribing witnesses.

CHARLES H. GERLING.

Witnesses:
C. N. TERRY,
FRANCES E. BROWN.